US010263241B2

(12) United States Patent
Small et al.

(10) Patent No.: US 10,263,241 B2
(45) Date of Patent: Apr. 16, 2019

(54) ELECTROLESS PROCESS FOR DEPOSITING REFRACTORY METALS (71) Applicant: Sandia Corporation, Albuquerque, NM (US)

(72) Inventors: Leo J. Small, Albuquerque, NM (US); Paul G. Clem, Albuquerque, NM (US); Erik David Spoerke, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 238 days.

(21) Appl. No.: 15/374,775

(22) Filed: Dec. 9, 2016

(65) Prior Publication Data
US 2018/0163309 A1 Jun. 14, 2018

(51) Int. Cl.
C23C 18/16 (2006.01)
H01M 4/04 (2006.01)
C23C 18/54 (2006.01)
H01M 4/66 (2006.01)

(52) U.S. Cl.
CPC ....... H01M 4/0404 (2013.01); C23C 18/1696 (2013.01); C23C 18/54 (2013.01); H01M 4/0452 (2013.01); H01M 4/0471 (2013.01); H01M 4/663 (2013.01)

(58) Field of Classification Search
CPC ................................ C23C 18/16; C23C 18/44
See application file for complete search history.

(56) References Cited

U.S. PATENT DOCUMENTS

| | | | | |
|---|---|---|---|---|
| 5,990,415 A | * | 11/1999 | Green | H01L 27/142 136/255 |
| 6,864,010 B1 | * | 3/2005 | McLean | H01M 8/1004 429/454 |
| 2005/0124158 A1 | * | 6/2005 | Lopatin | C23C 18/50 438/686 |
| 2013/0240484 A1 | * | 9/2013 | Kolics | C23C 18/38 216/105 |

FOREIGN PATENT DOCUMENTS

KR 20150047323 A * 5/2015

OTHER PUBLICATIONS

Shacham-Diamand, electroless silver and silver with tungsten thin films for microelectronics and microelectromechanical system application, 2000, 147(9) p. 3345-3349 (Year: 2000).*
Epifani, M. et al., "The Chloroalkoxide Route to Transition Metal Oxides. Synthesis of V2O5 Thin Films and Powders from a Vanadium Chloromethoxide", Chem. Mater. 21 (2009), pp. 1618-1626.
Granqvist, C.G., "Electrochromic Tungsten Oxide Films: Review of Progress 1993-1998", Solar Energy Materials & Solar Cells 60 (2000), pp. 201-262.
Small, L.J. et al., "Exploring Electrochromics: A Series of Eye-Catching Experiments to Introduce Students to Multidisciplinary Research", Journal of Chemical Education 91 (2014), pp. 2099-2104.
Tong, M. et al., "WO3 Thin Film Prepared by PECVD Technique and Its Gas Sensing Properties to NO2", Journal of Materials Science 36 (2001), pp. 2535-2538.

* cited by examiner

Primary Examiner — Dah-Wei D. Yuan
Assistant Examiner — Nga Leung V Law
(74) Attorney, Agent, or Firm — Kevin W. Bieg (57) ABSTRACT The invention provides an inexpensive, scalable process for coating materials with a film of a refractory metal. As an example, the immersion process can comprise the deposition of a sacrificial zinc coating which is galvanically displaced by the ether-mediated reduction of oxophilic $WCl_6$ to form a complex $WO_xCl_y$ film, and subsequently annealed to crystalline, metallic tungsten. The efficacy of this process was demonstrated on a carbon foam electrode, showing a 50% decrease in electrode resistance and significant gains in electrochemical performance. This process enables voltage efficiency gains for electrodes in batteries, redox flow batteries, and industrial processes where high conductivity and chemical stability are paramount.

19 Claims, 8 Drawing Sheets

ELECTROLESS PROCESS FOR DEPOSITING REFRACTORY METALS

STATEMENT OF GOVERNMENT INTEREST

This invention was made with Government support under contract no. DE-AC04-94AL85000 awarded by the U. S. Department of Energy to Sandia Corporation. The Government has certain rights in the invention.

FIELD OF THE INVENTION

The present invention relates to metal deposition and, in particular, to an electroless process for depositing refractory metals, such as tungsten.

BACKGROUND OF THE INVENTION

Tungsten is a refractory metal desirable for its large electrical conductivity, robust chemical stability, high melting point, and wear resistance. See E. Lassner and W.-D. Schubert, *The Element Tungsten*, Springer (1999); and C. Rollinson, *The Chemistry of Chromium, Molybdenum, and Tungsten*, Pergamon Press (1975). The ability to coat materials with a thin layer of tungsten would be advantageous in order to impart tungsten's chemical stability, mechanical stability, and electrical conductivity to the substrate, obviating the need for a heavy, pure tungsten object. See A. Brenner, *Electrodeposition of Alloys. Principle and Practice*, Academic Press (1963). Electroplating processes are inexpensive and typically used to coat substrates with metals such as zinc, nickel, and gold. See C. Mantell, *Industrial Electrochemistry*, 2nd ed., McGraw-Hill (1940). The electrochemical reduction of pure tungsten, however, is not achievable in aqueous solutions, due to the reduction potential residing below that of hydrogen evolution, and the low overpotential required for hydrogen evolution on tungsten oxides. See A. Brenner, *Electrodeposition of Alloys. Principle and Practice*, Academic Press (1963); C. Mantell, *Industrial Electrochemistry*, 2nd ed., McGraw-Hill, 1940; and A. Bard and L. Faulkner, *Electrochemical Methods: Fundamentals and Applications*, 2nd ed., Wiley, 2000. Reports of pure tungsten metal electrodeposition in non-aqueous electrolytes are limited to molten salts at temperatures over 300-500° C., requiring careful manipulation of deposition parameters and chemistry, and yielding low deposition rates. See K. Arpin et al., *Chem. Mater.* 23, 4783 (2011); K. Nitta et al., *Electrochim. Acta* 53, 20 (2007); C. J. Sequeira, *J. Electrochem. Soc.* 140, 2526 (1993); and A. Katagiri et al., *J. Electrochem. Soc.* 138, 767 (1991). Other reports demonstrate the ability to co-reduce tungsten with other transition metal elements such as nickel, iron, and cobalt in aqueous solutions. See M. Donten et al., *Electrochim. Acta* 45, 3389 (2000); N. Tsyntsaru et al., *Surf. Coat. Tech.* 203, 543 (2009); O. Younes-Metzler and E. Gileadi, *Electrochim. Acta* 48, 2551 (2003); O. Younes and E. Gileadi, *Electrochem. Solid St.* 3, 543 (2000); and N. Eliaz et al., *Electrochim. Acta* 50, 2893 (2005). Some of these alloys may contain as much as 70 at % tungsten metal. See N. Eliaz et al., *Electrochim. Acta* 50, 2893 (2005). For many applications, such as a cathode in a corrosive sodium battery, however, these alloying elements are electroactive and pure tungsten is required. See J. Kim et al., *Electroanal. Chem.* 759, 201 (2015); and H. Kim et al., *Chem. Rev.* 113, 2075 (2012).

Therefore, a need remains for an electroless process of depositing refractory metals, such as tungsten, on a substrate.

SUMMARY OF THE INVENTION

The present invention is directed to a novel process for the spontaneous deposition of refractory metals, such as tungsten, from a room temperature ethereal solution. For example, this immersion process can comprise the deposition of a sacrificial zinc coating which is galvanically displaced by the ether-mediated reduction of oxophilic tungsten hexachloride ($WCl_6$). Subsequent thermal treatment renders a crystalline, metallic tungsten film. The efficacy of this method was demonstrated on a carbon foam electrode, and the resulting electrochemical performance was interrogated with the canonical aqueous ferricyanide system. An unoptimized tungsten coating decreased the electrode and electrochemical cell resistances by 50%, resulting in a concomitant decrease in redox peak separation from 1.902 V to 0.783 V. This process enables voltage efficiency gains in electrodes for batteries, redox flow batteries, and industrial processes where high conductivity and chemical stability are paramount.

BRIEF DESCRIPTION OF THE DRAWINGS

The detailed description will refer to the following drawings, wherein like elements are referred to by like numbers.

FIGS. 2A-2D are plan-view SEM images of carbon foams taken after each step in the immersion tungsten process. FIG. 2D is an SEM image after $WCl_6$ treatment.

DETAILED DESCRIPTION OF THE INVENTION

The present invention is directed to a refractory metal electrodeposition process based on galvanic exchange, i.e.

an immersion process. Immersion processes require a sacrificial coating possessing a relatively low electrochemical reduction potential. The coated substrate is then immersed in a solution containing tungsten ions with a higher reduction potential. Thermodynamics dictates that this sacrificial coating will be spontaneously oxidized into solution as the dissolved ions are reduced onto the substrate surface.

Figure 8:
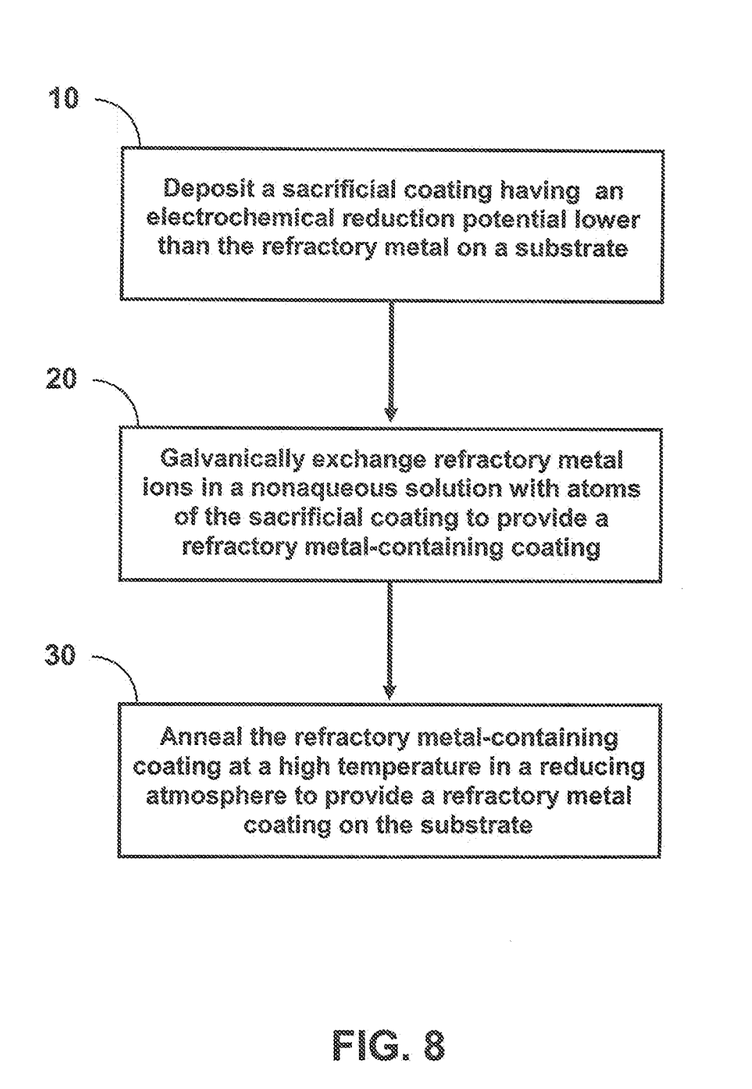
FIG. 8 is a flow chart illustrating the steps of an electroless process for depositing a refractory metal.

The steps of the electroless process for depositing a refractory metal of the present invention are shown in FIG. 8. The electroless process for depositing a refractory metal comprises depositing a sacrificial coating having an electrochemical reduction potential lower than the refractory metal on a surface of a substrate, as shown in step 10, and immersing the coated substrate in a nonaqueous solution containing dissolved refractory metal ions, whereby the sacrificial coating is oxidized and the dissolved refractory metal ions are reduced onto the surface of the substrate by a galvanic exchange to provide a refractory metal-containing coating on the surface, as shown in step 20. As an example, an electroless process for depositing tungsten, wherein the salt providing the dissolved tungsten ions is tungsten hexachloride ($WCl_6$), is described below. Other possible salts include $WF_6$, $WCl_4$, $WBr_6$, $WBr_5$, $WOCl_4$, or a tungsten metallocene (e.g., bis(cyclopentdienyl)tungsten or similar). Other refractory metals that have a relatively high electrochemical reduction potential, such as molybdenum, niobium, or tantalum, can also be used. Zinc is used as the sacrificial coating in the example. However, other sacrificial materials having a relatively low electrochemical reduction potential, such as lithium, sodium, potassium, magnesium, or manganese, can also be used. The solvent can typically be an ether or combination of ethers (as used herein, ether refers to a class of organic compounds having an oxygen atom connected to two alkyl and/or aryl groups, i.e., R—O—R'). Diethyl ether is used in the example, however, other ethers can also be used, such as a polyether, cyclic ether, glycol ether, tetrahydrofuran, or dioxane. Further, the solution can comprise an ether in a secondary solvent, provided the secondary solvent doesn't react with the refractory metal salt (e.g., water would not typically be used as a secondary solvent). The refractory metal-containing coating can be subjected to a reducing atmosphere at a sufficiently high annealing temperature to completely convert the coating to the refractory metal, as shown in step 30. The reducing atmosphere can have an oxygen partial pressure low enough to reduce any refractory metal oxide (e.g., $WO_x$, $MoO_x$, $NbO_x$, or $TaO_x$) to the refractory metal. For example, the reducing atmosphere can comprise a forming gas. The annealing temperature should be sufficiently high to drive off any residual O, C, or Cl, for example. Therefore, the annealing temperature is preferably greater than 300° C. and, more preferably, about 800° C., as described in the example. The substrate should be capable of having the sacrificial coating applied to it, should not be soluble in ether, and should be able to withstand the annealing temperature. Therefore, carbon substrates are preferred, including carbon powder, graphite, glassy carbon, vitreous carbon, carbon foams, and carbon felts. Glasses, ceramics, metals, and some plastics (e.g., polyimide) can also be used if they satisfy the above requirements.

As an example of the invention, an electroless process for depositing tungsten is described herein. For the immersion deposition of tungsten, a sacrificial zinc coating can first be deposited onto a substrate. The standard reduction potential of $Zn/Zn^{2+}$ is –0.76 V vs. the standard hydrogen electrode (SHE), compared to –0.09 V for tungsten/$WO_3$, providing the requisite driving force. See A. Bard and L. Faulkner, *Electrochemical Methods: Fundamentals and Applications*, 2nd ed.; Wiley (2000). Galvanic exchange of $Zn^0$ for $W^{6+}$ readily proceeds for $WCl_6$ in anhydrous diethyl ether, evolving gaseous chloroethane and leaving a black film on the zinc surface. The resulting film, however, is not metallic tungsten, but rather a complex, amorphous $WO_xCl_y$. Conversion to crystalline, metallic tungsten can be achieved upon annealing in a moderately reducing atmosphere.

In particular, circular coupons 10 mm in diameter were punched out of 1 mm thick graphite foil. Onto these coupons zinc was galvanostatically electroplated at –10 mA cm$^{-2}$ for 30-1500 s in an aqueous bath consisting of 0.1 M $ZnSO_4 \cdot H_2O$, 2 M NaOH, and 0.6 M d-sorbitol. All water was purified to 18.2 MΩ·cm. The bath was magnetically stirred and maintained at room temperature. A zinc foil (10×5 cm$^2$, 99.99%) served as the anode, while the cell potential was monitored with a Ag/AgCl (3 M NaCl) reference electrode. Zinc-coated coupons were triply rinsed under deionized water, dried under nitrogen, evacuated to <0.1 mTorr, and loaded into an argon-filled glovebox. Coupons were soaked for 30 minutes in 10 mL of 50 mM $WCl_6$ in anhydrous diethyl ether. After rinsing in fresh diethyl ether, coupons were annealed in a tube furnace at 800° C. for 3 h under constant flow of 1 atm ultra-high purity forming gas (3% $H_2$ in $N_2$) using a ramp rate of ±10° C. min$^{-1}$. Carbon foam electrodes (Duocel® reticulated vitreous carbon foam, ERG Aerospace Corporation, Oakland, Calif., 60 ppi) were cut to 75×5×3 mm$^3$ and tungsten coated in a similar fashion, except zinc plating occurred at –1 mA per cm$^2$ of manufacturer-specified surface area for 300-15,000 s.

The chemical evolution of the surface during this immersion tungsten process is described below, and shows how this simple, inexpensive method allows for deposition on complex, porous geometries. Moreover, this process is highly scalable and is not limited by "line-of-site" deposition processes (e.g. sputtering). While other reports have used $WOCl_4$ or similar precursors to create $WO_3$ thin films by chemical vapor deposition, these reports did not reduce the $W^{6+}$, as $WO_3$ is desirable for electrochromic and gas sensing applications. See M. Tong et al., *J. Mater. Sci.* 36, 2535 (2001); M. Epifani, *J. Chem. Mater.* 21, 5215 (2009); L. Small et al., *J. Chem. Ed.* 91, 2099 (2014); and C. Granqvist, *Sol. Energy Mater. Sol. Cells* 60, 201 (2000).

The process described herein addresses limitations of other tungsten deposition processes which require vacuum systems, high temperature molten salt electrochemistry, or pyrophoric or toxic chemicals. The efficacy of this process is demonstrated on a carbon foam electrode, and the resulting electrochemical performance is interrogated with the canonical aqueous ferricyanide system. An unoptimized tungsten coating decreased the electrode and electrochemical cell resistances by 50%, promising voltage efficiency gains in electrodes for batteries, redox flow batteries, and industrial processes where high conductivity and chemical stability are paramount.

The exemplary tungsten immersion process comprised three steps:
 (1) electrodeposition of a sacrificial zinc coating,
 (2) galvanic exchange in an ethereal $WCl_6$ solution, and
 (3) annealing at 800° C. in forming gas.
During step (1) $Zn(OH)^{2-}$ was reduced onto the graphite surface as follows:

$$Zn(OH)_4^{2-} + 2e^- \rightarrow Zn(s) + 4OH^- \qquad (1)$$

The zinc-coated substrate was dried and immersed in an anhydrous ethereal $WCl_6$ solution, forming a complex $WO_x$-$Cl_y$ film (4<2x+y<6). The postulated reaction is as follows:

$$WCl_6 + \left(3 - x - \frac{y}{2}\right)Zn + xOEt_2 \rightarrow \quad (2)$$

$$WO_xCl_y + 2xEtCl + \left(3 - x - \frac{y}{2}\right)Zn^{2+} + (6 - 2x - y)Cl^-$$

Upon annealing in forming gas, the reduction may be written:

$$WO_xCl_y + \left(x + \frac{y}{2}\right)H_2 \rightarrow W^0 + xH_2O + yHCl \quad (3)$$

In order to elucidate the chemical evolution of a graphite surface during this immersion process, X-ray diffraction (XRD), scanning electron microscopy (SEM), Fourier transform infrared spectroscopy (FT-IR), and X-ray photoelectron spectroscopy (XPS) measurements were recorded for the as-received graphite and after each process step outlined above.

Figure 1:
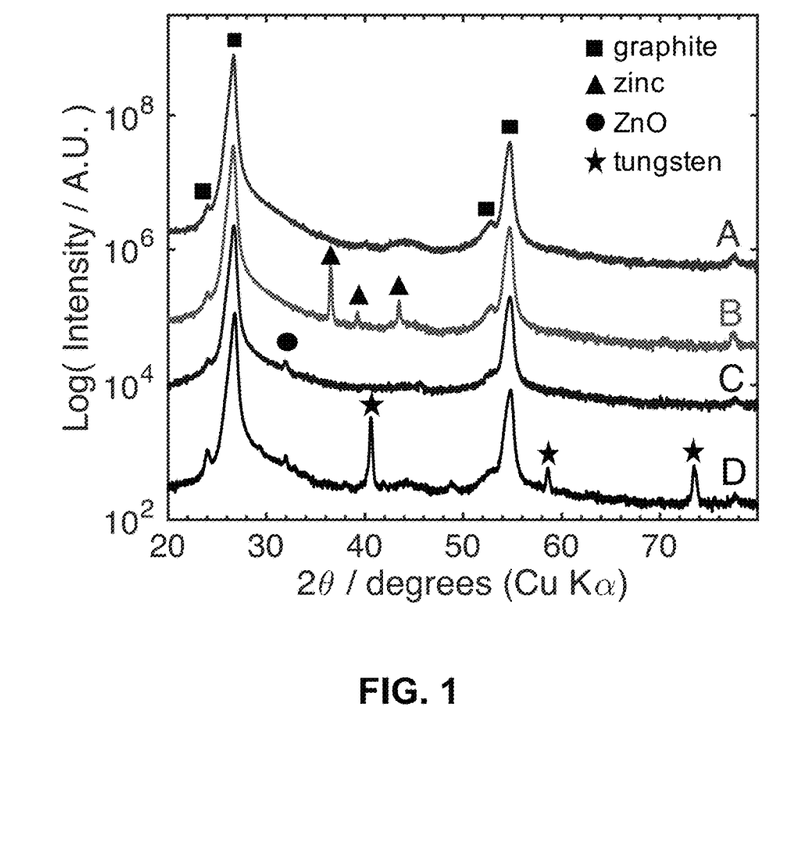
FIG. 1 is a graph of log-scale X-ray (Cu Kα) diffraction (XRD) patterns recorded after each step in the immersion tungsten process: as-received graphite (plot A), after zinc electroplating (plot B), after $WCl_6$ treatment (plot C), and after annealing (plot D).

Crystallinity was evaluated using X-ray diffraction. XRD patterns characteristic of this process are presented in FIG. 1. An as-received graphite substrate is identified in plot A. After electrodeposition of zinc, peaks characteristic of zinc metal are observed in plot B. Once treated with $WCl_6$ in diethyl ether (plot C), these zinc metal peaks disappear, consistent with the galvanic displacement of Zn by $W^{6+}$. Besides the substrate and a trace ZnO peak, the absence of peaks implies an amorphous surface. After annealing, sharp tungsten metal peaks are seen in plot D, confirming the presence of crystalline tungsten metal on the substrate.

Figure 2A:
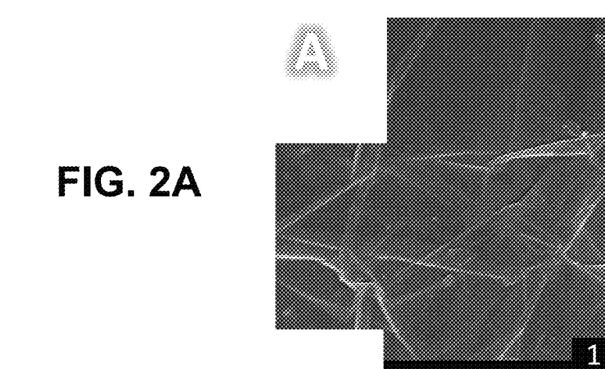
FIG. 2A is an SEM image of as-received graphite.
Figure 2B:
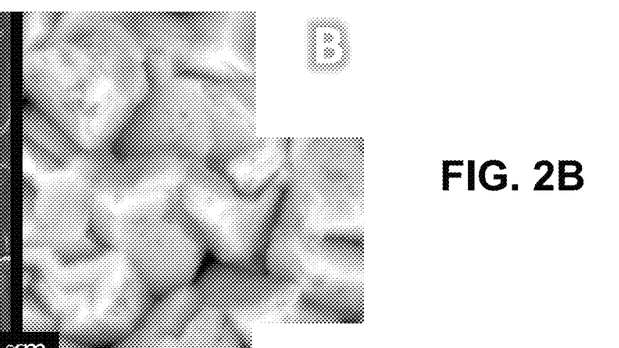
FIG. 2B is an SEM image after zinc electroplating.
Figure 2C:
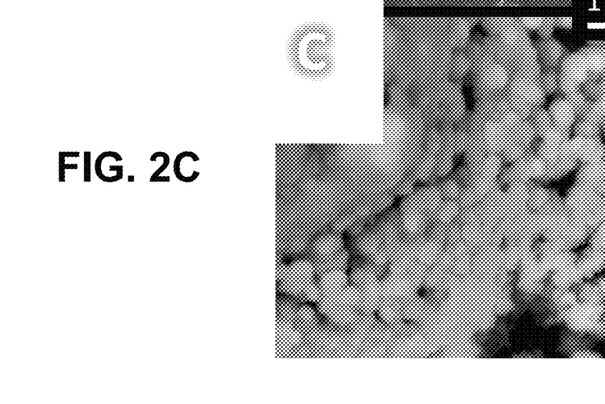
Figure 2D:
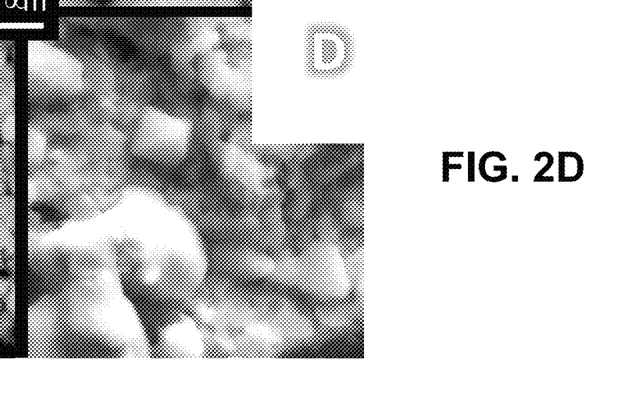
FIG. 2D is an SEM image after annealing.

Surface morphology and film thickness were evaluated with a scanning electron microscope. SEM analysis of the graphite surface reveals the thin layered structure expected for graphite in FIG. 2A. The electrodeposited zinc in FIG. 2B shows a film of densely packed, smooth faceted zinc crystals, each about 1 μm in diameter. After treatment in an ethereal $WCl_6$ solution, the zinc film becomes covered in smooth, round particles, some of which are discrete, as seen in the upper right corner of FIG. 2C, while in other areas these particles are less easily distinguished and form an amorphous film. Upon annealing, a tungsten film with grains ranging in size 1-30 μm is seen in FIG. 2D, with smaller crystals about 1 μm in diameter observed forming on the surface of the film.

Figure 3:
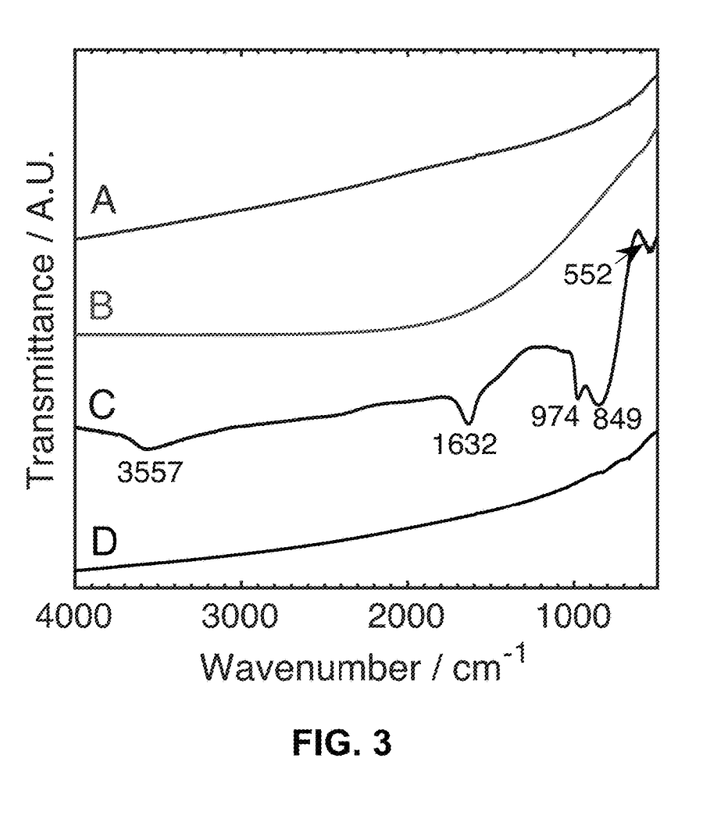
FIG. 3 is a graph of grazing angle FT-IR spectra recorded after each step in the immersion tungsten process: as-received graphite (plot A), after zinc electroplating (plot B), after $WCl_6$ treatment (plot C), and after annealing (plot D).

Grazing angle FT-IR was used to further characterize the chemical species on the graphite surface during the immersion tungsten process, and characteristic spectra are plotted in FIG. 3. Both as-received graphite and zinc-plated graphite display no IR-active modes, characteristic of a metallic surface, as shown in plots A and B, respectively. See M. Fu et al., *J. Mater. Chem. A* 2, 735 (2014). After $WCl_6$ treatment, as shown in plot C, distinct peaks are observed at 3557, 1632, 974, 849, and 552 cm$^{-1}$. The peak at 3557 cm$^{-1}$ is assigned to O—H stretching, while that at 1632 is due to water adsorbed during the brief transfer from glovebox to the IR chamber. See N. Sharma et al., *J. Non. Cryst. Sol.* 306, 129 (2002); M. Daniel et al., *J. Sol. Stat. Chem.* 73, 127 (1988). Peaks at 974 and 849 cm$^{-1}$ are attributed to W=O and W—O—W stretching, consistent with literature reports for various $WO_xCl_y$. See M. Daniel et al., *J. Sol. Stat. Chem.* 73, 127 (1988); D. Neikirk et al., *J. Mol. Struct.* 244, 165 (1991); and P. Charlton et al., *J. Solid State Chem.* 168, 175 (2002). The peak at 552 cm$^{-1}$ is attributed to tungsten-peroxo linkages. See N. Sharma et al., *J. Non. Cryst. Sol.* 306, 129 (2002). These results are consistent with a formation of a hygroscopic, tungsten oxychloride surface, created by galvanic displacement of zinc metal by $WCl_6$ onto the graphite surface. Upon annealing, all of the observed peaks disappear, as shown in plot D, in agreement with XRD data and the reduction of the intermediate $WO_xCl_y$ to tungsten metal.

Figure 4:
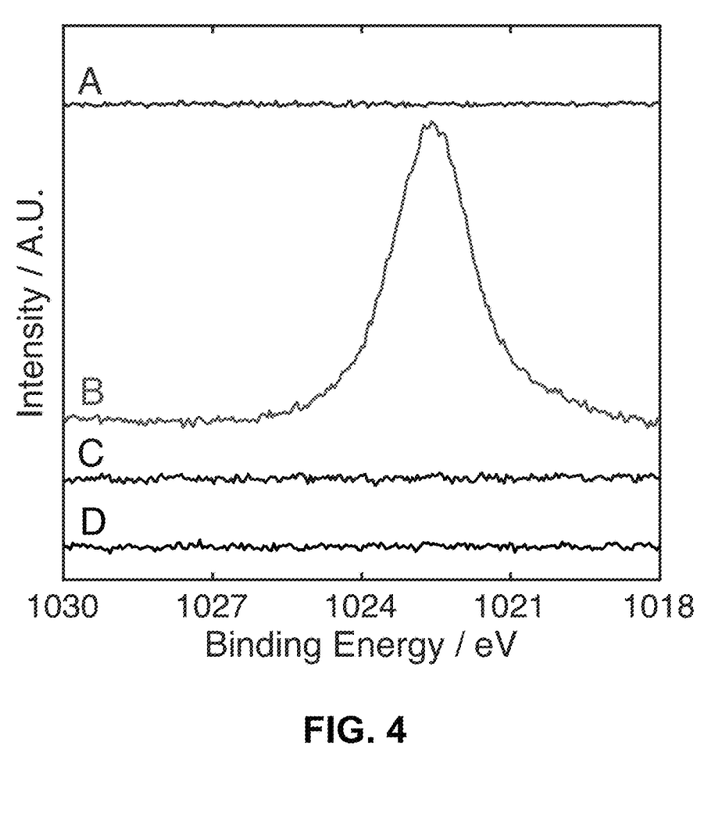
FIG. 4 is a graph of zinc $2p_{3/2}$ XPS spectra after each step in the immersion tungsten process: as-received graphite (plot A), after zinc electroplating (plot B), after $WCl_6$ treatment (plot C), and after annealing (plot D).

To better understand the redox processes during the immersion tungsten process, X-ray photoelectron spectroscopy measurements were recorded after each step. Zinc $2p_{3/2}$ spectra, plotted in FIG. 4, confirm a zinc-free graphite surface (plot A) onto which zinc is successfully electrodeposited (plot B), with subsequent removal during $WCl_6$ treatment (plot C). This data is consistent with XRD and FT-IR results. While a trace ZnO peak is observed in XRD after $WCl_6$ treatment, this peak is not observed in XPS, suggesting that any trace ZnO is not present at the surface. Tungsten 4f spectra confirm the absence of tungsten on the graphite and zinc-plated surfaces.

Figure 5:
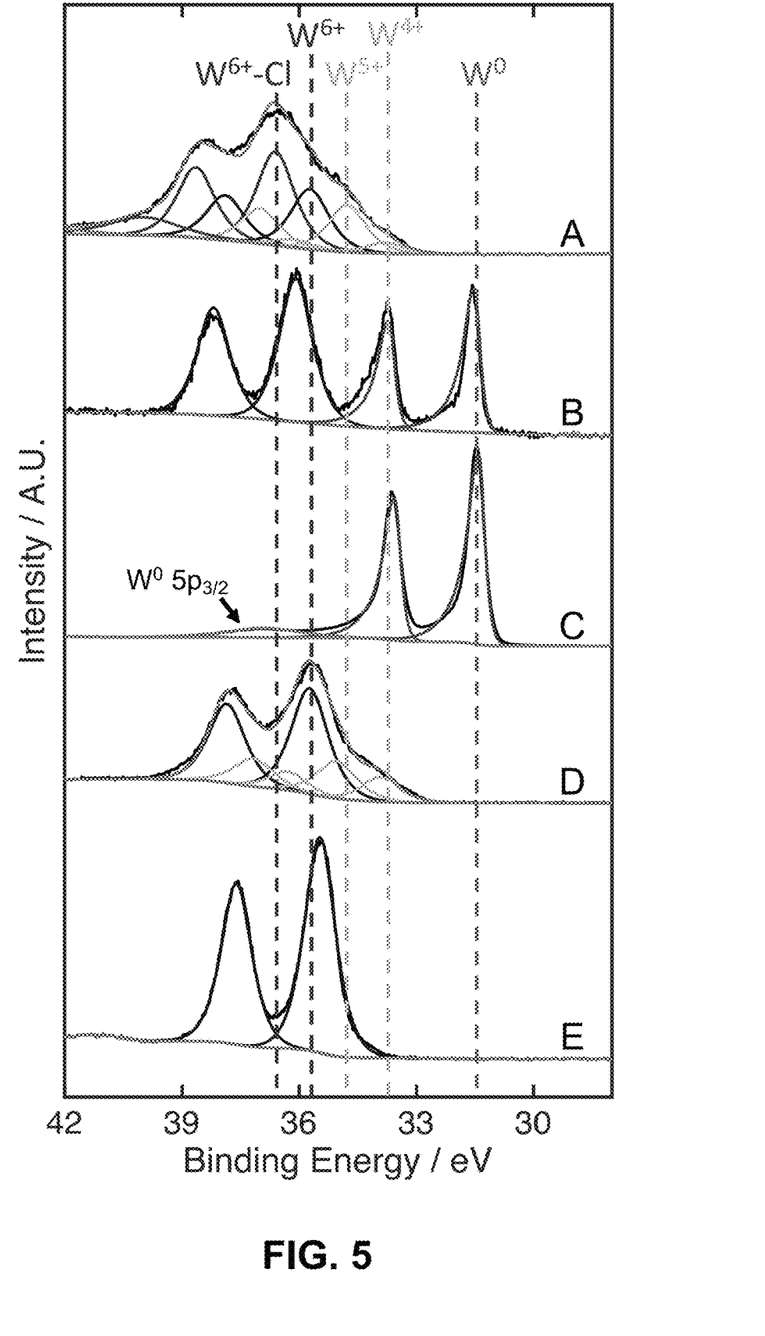
FIG. 5 is a graph of tungsten 4f XPS spectra after $WCl_6$ treatment (plot A), and annealing (plot B) compared to sputter-cleaned $W^0$ standard (plot C), $WO_2$ standard (plot D), and $WO_3$ standard (plot E). Dotted lines denote the location of the fitted W $4f_{7/2}$ peaks.

Upon $WCl_6$ treatment, a broad W 4f spectrum is observed in FIG. 5, plot A. Comparison to tungsten foil, $WO_2$, and $WO_3$ standards in plots C-E indicates that $WCl_6$ treatment has created tungsten in the 6+, 5+, and 4+ oxidation states. Tungsten 4f peaks with binding energies higher than those of the $WO_3$ standard were observed, consistent with $WOCl_4$ and $WO_2Cl_2$ states. See P. Gassman et al., *J. Am. Chem. Soc.* 107, 2380 (1985). Here XPS peaks at binding energies similar to $WO_3$ have been labeled "$W^{6+}$," while those shifted to higher energies by chloride ligands are labeled "$W^{6+}$—Cl." The location of the fitted tungsten $4f_{7/2}$ peaks and their relative areas are compiled in Table 1, consistent with the locations of similar tungsten species in the literature. See P. Biloen and G. Pott, *J. Catal.* 30, 169 (1973); A. Katrib et al., *J. Electron. Spec. and Rel. Phemon.* 76, 195 (1995); R. Gehlig et al., *J. Solid. Stat. Chem.* 49, 318 (1983); F. Xie et al., *J. Electron. Spec. and Rel. Phemon.* 185, 112 (2012); O. Y. Khyzhun, *J. Alloys and Comp.* 305, 1 (2000); N. Alov, *J. Anal. Chem.* 60, 431 (2005); and A. Gulino et al., *J. Chem. Soc. Faraday Trans.* 92, 2137 (1996). A satisfactory fit could not be achieved if the $W^{5+}$ peak, therefore it was omitted. The Ve and $W^{4+}$ peaks would need to be uncharacteristically wide for a $W^{5+}$ peak to be fit.

TABLE 1

Relative parameters for W $4f_{7/2}$ XPS peaks. Asterisks (*) denote a reference material. Locations (Loc.) are given as binding energies (eV).

| Sample | $W^0$ | | $W^{4+}$ | | $W^{5+}$ | | $W^{6+}$ | | $W^{6+}$-Cl | |
|---|---|---|---|---|---|---|---|---|---|---|
| | Loc. | % Area | Loc. | % Area | Loc. | % Area | Loc. | % Area | Loc. | % Area |
| $WCl_6$-treated | — | — | 33.8 | 5.1 | 34.8 | 22.2 | 35.7 | 28.2 | 36.6 | 44.5 |
| W metal | 31.5 | 39.3 | — | — | — | — | 36.0 | 60.7 | — | — |
| W foil* | 31.4 | 100. | — | — | — | — | — | — | — | — |
| $WO_2$* | — | — | 33.8 | 12.7 | 34.8 | 16.8 | 35.7 | 70.4 | — | — |
| $WO_3$* | — | — | — | — | — | — | 35.5 | 100. | — | — |

The W 4f XPS spectrum becomes considerably simplified upon annealing, where it is reduced to two distinct pairs of tungsten $4f_{7/2}$ and $4f_{5/2}$ peaks. Comparison of the tungsten standards ($WO_3$, $WO_2$, and tungsten foil) to the annealed tungsten in plot D allows ready identification of tungsten metal and $W^{6+}$, the latter resulting from native oxide formation during air exposure. The binding energy of the $W^{6+}$ peak is shifted to slightly higher binding energies. These results are consistent with XRD and FT-IR results, confirming reduction of the complex $WO_xCl_y$ formed during $WCl_6$ treatment. Since no $WO_3$ was observed in XRD or FT-IR after annealing, it is concluded that all $W^{6+}$ seen in XPS after annealing is native surface oxide.

Figure 6:
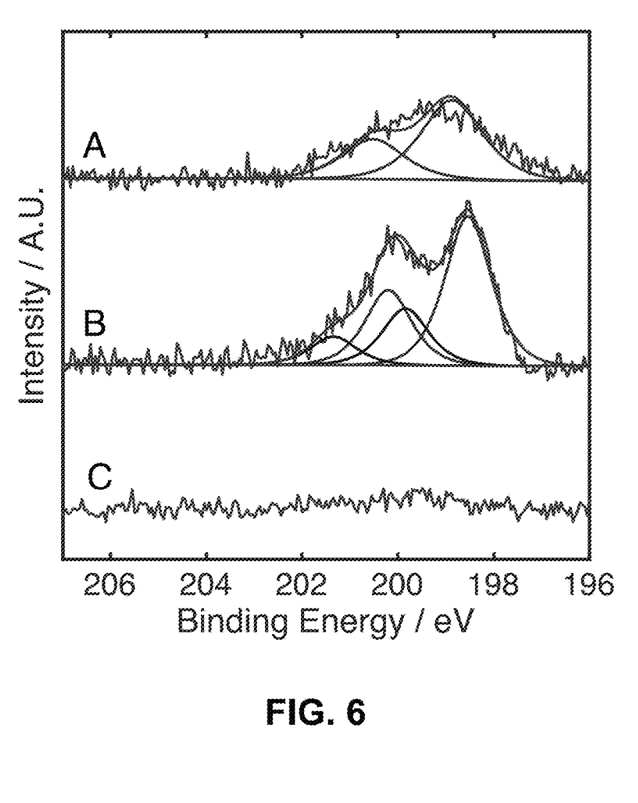
FIG. 6 is a graph of chlorine 2p XPS spectra after zinc electroplating (plot A), $WCl_6$ treatment (plot B), and annealing (plot C).

Investigation of the chlorine 2p spectra in FIG. 6 further confirms formation of a $WO_xCl_y$ species. While Zn-electroplated samples display chloride ion contamination attributed to NaCl at 198.5 eV in plot A (a Na 1s peak is also present), a new higher energy peak appears at 199.8 eV after $WCl_6$ treatment in plot B, consistent with literature reports of $WOCl_4$. See B. Beard, *Surf. Sci. Spectra* 2, 91 (1994); M. Tong et al., *J. Mater. Sci.* 36, 2535 (2001); A. Neilson and J. Metson, *Polyhedron* 31, 143 (2012). This peak cannot be ascribed to $WCl_6$ (198.9 eV) or volatile chloroethane (200.7 eV). See H.-M. Wu and S.-A. Chen, *Synthetic Met.* 20, 169 (1987); and X.-L. Zhou et al., *J. Surf. Sci.* 271, 452 (1992).

XRD, SEM, FT-IR, and XPS results consistently show the evolution of the graphite surface throughout the immersion tungsten process from as-received graphite, to zinc-coated, to amorphous $WO_xCl_y$, to crystalline, metallic tungsten. The ability of $WCl_6$ to galvanically displace zinc metal on the graphite surface is unique to specific solvents; this reaction will not proceed in benzene, dichloromethane, chloroform, N,N-dimethylformamide, or various imidazolium ionic liquids (or water). It is thought that the oxophilic $WCl_6$ activates the diethyl ether, enabling cleavage of the C—O bond, similar to previous literature reports with $MoCl_5$ and $WCl_6$ in polyethers. See S. Dolci et al., *Dalton Trans.* 39, 5367 (2010); and C. Persson and C. Andersson, *Polyhedron* 10, 2089 (1991). Without a reductant, no film was deposited. The addition of zinc provides a convenient method whereby the tungsten may be reduced and some chloride ligands shed. While other reports have used solution-bound reductants such as allyltrimethylsilane, reduction onto a surface affords a conformal coating of solid $WO_xCl_y$, advantageous for coating porous substrates with tungsten metal. See C. Persson and C. Andersson, *Polyhedron* 10, 2089 (1991).

Tungsten Deposition on a Carbon Foam Electrode

As an example of the invention, the immersion tungsten process was applied to vitreous carbon foam, a porous, high surface area material commonly employed in electrochemical cells. In order to verify that the annealing process did not influence the electrical resistivity of the carbon foam, a control sample was subject to only the annealing step. Foam resistance, as measured by a simple two-point method across the entire foam length, decreased from 55.8 to 28.0Ω for the tungsten-coated sample, while the control sample showed a nominal decrease in resistance from 55.8 to 54.5Ω.

Figure 7A:
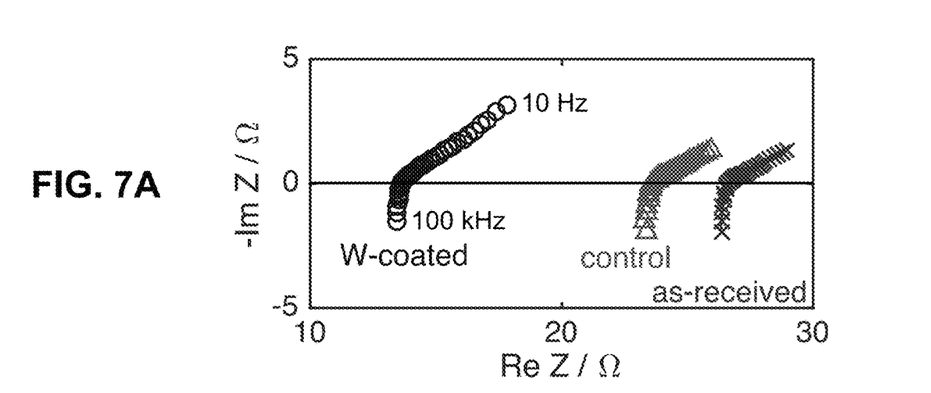
FIG. 7A is a graph of Nyquist plots at the open circuit potential.

These carbon foams were employed as the working electrode in an electrochemical cell using the canonical ferricyanide system at neutral pH (pH=5.7). Electrochemical impedance spectroscopy of the cell, plotted in the Nyquist fashion in FIG. 7A, shows a decrease in the series resistance of the cell for the tungsten-coated electrode, from 26 to 13Ω, while that of the control sample slightly decreased from 26 to 23Ω. Here the series resistance of the cell is defined as the x-axis intercept. See E. Barsoukov and J. Macdonald, *Impedance Spectroscopy: Theory, Experiment, and Applications,* 2nd ed.; Wiley (2005); and N. Hudak et al., *J. Electrochem. Soc.* 162, A2188 (2015). These results are consistent with the simple two-point resistance measurements and demonstrate that a lower resistance electrode effectively lowers the total cell resistance. For power systems such as batteries, this decreased cell resistance directly translates into a higher voltage efficiency.

Figure 7B:
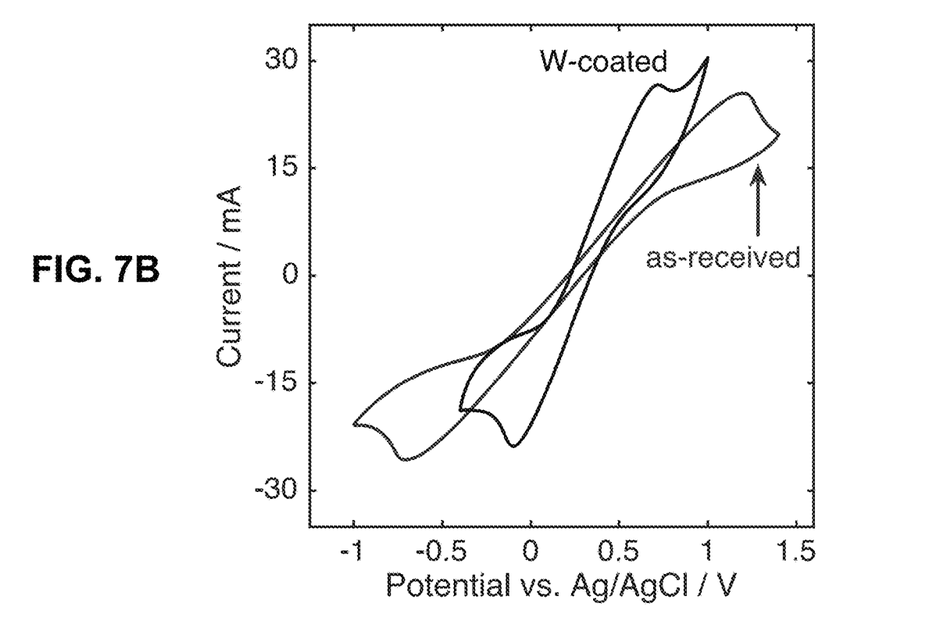
FIG. 7B is a graph of CVs ($10^{th}$ scan at 100 mV $s^{-1}$) of carbon foams in 10 mM aqueous ferricyanide and 0.5 M NaCl. "Control" denotes a carbon foam subjected only to thermal treatment.

Moreover, the decrease in cell resistance positively influences the electrochemical performance of the cell, as demonstrated using cyclic voltammetry (CV) in FIG. 7B. CVs of the as-received carbon foam display a large separation between reduction and re-oxidation peaks of the ferricyanide. Upon coating the carbon foam in tungsten this peak separation is reduced from 1.902 to 0.783 V, indicating that a lower voltage is necessary to achieve similar peak current. Thus, addition of tungsten to the electrode reduced the electrode resistance, effectively lowering the IR ohmic losses of the cell and increasing overall electrochemical performance.

The present invention has been described as an electroless process for depositing a refractory metal. It will be understood that the above description is merely illustrative of the applications of the principles of the present invention, the scope of which is to be determined by the claims viewed in light of the specification. Other variants and modifications of the invention will be apparent to those of skill in the art.

We claim:

1. An electroless process for depositing a refractory metal, comprising:
   depositing a sacrificial coating having an electrochemical reduction potential lower than the refractory metal on a surface of a substrate; and
   immersing the coated substrate in a nonaqueous solution containing dissolved refractory metal ions, whereby atoms of the sacrificial coating are oxidized into the nonaqueous solution and the dissolved refractory metal ions are reduced onto the surface of the substrate by galvanic exchange with the atoms of the sacrificial coating to provide a refractory metal-containing coating on the surface.

2. The process of claim 1, wherein the refractory metal comprises tungsten.

3. The process of claim 1, wherein the refractory metal comprises molybdenum, niobium, or tantalum.

4. The process of claim 1, wherein the sacrificial coating comprises zinc.

5. The process of claim 1, wherein the sacrificial coating comprises lithium, sodium, potassium, magnesium, or manganese.

6. The process of claim 1, wherein the nonaqueous solution comprises ether.

7. The process of claim 6, wherein the ether comprises diethyl ether.

8. The process of claim 6, wherein the ether comprises a polyether, cyclic ether, glycol ether, tetrahydrofuran, or dioxane.

9. The process of claim 2, wherein a salt providing the dissolved tungsten ions comprises tungsten hexachloride.

10. The process of claim 2, wherein a salt providing the dissolved tungsten ions comprises $WF_6$, $WCl_4$, $WBr_6$, $WBr_5$, $WOCl_4$, or a tungsten metallocene.

11. The process of claim 1, wherein the substrate comprises graphite.

12. The process of claim 1, wherein the substrate comprises a carbon foam.

13. The process of claim 1, wherein the substrate comprises carbon powder, glassy carbon, vitreous carbon, or a carbon felt.

14. The process of claim 1, wherein the substrate comprises a glass, ceramic, metal, or plastic.

15. The process of claim 1, further comprising annealing the refractory metal-containing coating in a reducing atmosphere at a sufficiently high annealing temperature to convert the refractory metal-containing coating to the refractory metal.

16. The process of claim 15, wherein the reducing atmosphere has an oxygen partial pressure low enough to reduce any refractory metal oxide to the refractory metal.

17. The process of claim 15, wherein the reducing atmosphere comprises a forming gas.

18. The process of claim 5, wherein the sufficiently high annealing temperature is greater than 300° C.

19. The process of claim 1, wherein the refractory metal-containing coating comprises a refractory metal oxide or refractory metal oxyhalide.

* * * * *